US012726821B2

(12) United States Patent
Layouni et al.

(10) Patent No.: US 12,726,821 B2
(45) Date of Patent: Sep. 1, 2026

(54) SECURE RANGING SYSTEM

(71) Applicant: GM Global Technology Operations LLC, Detroit, MI (US)

(72) Inventors: Mohamed A. Layouni, Fraser, MI (US); Aaron Adler, Rochester Hills, MI (US); Jason Grembi, Armada, MI (US)

(73) Assignee: GM Global Technology Operations LLC, Detroit, MI (US)

(*) Notice: Subject to any disclaimer, the term of this patent is extended or adjusted under 35 U.S.C. 154(b) by 45 days.

(21) Appl. No.: 18/677,409

(22) Filed: May 29, 2024

(65) Prior Publication Data

US 2025/0374055 A1 Dec. 4, 2025

(51) Int. Cl.
*B60R 25/24* (2013.01)
*B60R 25/20* (2013.01)
(Continued)

(52) U.S. Cl.
CPC ........... *H04W 12/086* (2021.01); *B60R 25/20* (2013.01); *B60R 25/2018* (2013.01);
(Continued)

(58) Field of Classification Search
CPC ....... H04W 4/80; H04W 12/06; H04W 12/63; H04W 4/023; H04W 12/08; H04W 4/40;
(Continued)

(56) References Cited

U.S. PATENT DOCUMENTS 9,123,244 B2 * 9/2015 Daman .................. G08G 1/127
11,995,496 B1 * 5/2024 Mars ....................... H04W 4/80
(Continued)

FOREIGN PATENT DOCUMENTS

CN 213210483 U 5/2021
WO WO-2019067105 A1 4/2019

OTHER PUBLICATIONS

Jonathan Main, “How Wireless Technologies Can Transform In-Store Payments”, Apr. 29, 2024, obtained online from <https://www.emvco.com/knowledge-hub/how-wireless-technologies-can-transform-in-store-payments/>, retrieved on Nov. 28, 2025 (Year: 2024).*

*Primary Examiner* — Zhimei Zhu
(74) *Attorney, Agent, or Firm* — Honigman LLP; Matthew H. Szalach

(57) ABSTRACT

A computer-implemented method including receiving, at a controller of a responder device, a connection request from an initiator device, executing, via a secure ranging application of the controller, a UWB ranging session, and executing, via the controller, a first measurement of the initiator device relative to the responder device, identifying at least one verification protocol of the secure ranging application based on the executed UWB ranging session, the at least one verification protocol including at least one of a correlation-based ranging protocol, a secondary ranging protocol, a motion sensor protocol, and a dual factor protocol, executing, based on technology resources of the responder device, one of the correlation-based ranging protocol, the secondary ranging protocol, the motion sensor protocol, and the dual factor protocol, and executing, based on the at least one verification protocol, a command function at the controller of the responder device.

20 Claims, 11 Drawing Sheets

(51) Int. Cl.
*H04W 12/069* (2021.01)
*H04W 12/086* (2021.01)

(52) U.S. Cl.
CPC ........... *B60R 25/24* (2013.01); *H04W 12/069* (2021.01); *B60R 2325/205* (2013.01)

(58) Field of Classification Search
CPC .. H04W 12/122; H04W 12/50; H04L 63/107; H04L 67/12; H04L 69/18; H04L 69/24; H04L 9/3242; B60R 2325/205; B60R 25/246; B60R 25/243; B60R 25/2036; B60R 25/00; B60R 25/10; B60R 25/30
See application file for complete search history.

(56) References Cited

U.S. PATENT DOCUMENTS

| | | | | |
|---|---|---|---|---|
| 2018/0103414 | A1* | 4/2018 | Golsch | G01S 13/876 |
| 2018/0148015 | A1* | 5/2018 | Weghaus | B60R 25/24 |
| 2018/0338330 | A1* | 11/2018 | Ledvina | H04W 12/50 |
| 2019/0061686 | A1* | 2/2019 | Neuhoff | H04W 4/023 |
| 2019/0089532 | A1* | 3/2019 | Lambert | H04L 63/0853 |
| 2019/0253404 | A1* | 8/2019 | Briceno | H04W 12/06 |
| 2020/0062217 | A1* | 2/2020 | Ledvina | H04W 64/00 |
| 2020/0198580 | A1* | 6/2020 | Saleh | B60R 25/24 |
| 2022/0139134 | A1* | 5/2022 | Yun | H04L 63/0853 340/5.61 |
| 2023/0403552 | A1* | 12/2023 | Ishiguro | H04L 9/0866 |
| 2024/0129698 | A1* | 4/2024 | Khan | H04W 4/80 |
| 2024/0233462 | A1* | 7/2024 | Ziller | G07C 9/00309 |
| 2024/0414538 | A1* | 12/2024 | Top | H04W 12/12 |
| 2024/0430683 | A1* | 12/2024 | Kekicheff | H04W 12/71 |
| 2025/0392346 | A1* | 12/2025 | Reddy | H04B 1/7163 |

* cited by examiner

SECURE RANGING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a secure ranging system and in some instances, a secure ranging system for a vehicle.

Secure ranging is a feature that is used to structure digital keys for mobile wallets, which may be used in combination with vehicles. Mobile wallets may be used for various functions of the vehicle, such as unlocking or starting the vehicle. Secure ranging typically uses standard modes including a static mode, a provisional mode, and a dynamic mode. The mode available for use with digital keys is the static mode. The static mode uses a sequence of keys that repeat across ranging rounds. Due to the repetition, it is possible to monitor the key sequence in one round and mimic an authorized actor in subsequent rounds. Thus, there is a need for improving or hardening security measures related to the static mode to prevent mimicking of key sequences or verify the initiating party.

SUMMARY

In some aspects, a computer-implemented method when executed by data processing hardware causes the data processing hardware to perform operations. The operations include receiving, at a controller of a responder device, a connection request from an initiator device, executing, via a secure ranging application of the controller, an ultra wideband (UWB) ranging session, and executing, via a secure ranging application of the controller, an ultra wideband (UWB) ranging session. The operations also include identifying at least one verification protocol of the secure ranging application based on the executed UWB ranging session. The at least one verification protocol includes a correlation-based ranging protocol. The correlation-based ranging protocol includes executing, based on the first measurement being within a measurement range, a localization function via the secure ranging application, sending, based on the executed localization function, localization data including one or more of a responder identification (ID), an initiator ID, an initiator location, and a ranging time to a back office server, requesting, via the back office server, log ranging data from an authorized device, and comparing the localization data with the log ranging data. The operations also include executing, via the secure ranging application, the at least one verification protocol and executing, based on the at least one verification protocol, a command function at the controller of the responder device.

In some examples, the secure ranging application may be a hybrid application configured to identify the at least one verification protocol based on technology resources of at least one of the responder device and the initiator device. The at least one verification protocol may include the correlation-based ranging protocol, a secondary ranging protocol, a motion sensor protocol, and a dual factor protocol. Optionally, executing the at least one verification protocol may include executing the correlation-based ranging protocol. In some instances, executing the at least one verification protocol may include executing the secondary ranging protocol. The secondary ranging protocol may include executing a second measurement via a measurement function of the secure ranging application, comparing the measured second measurement with the first measurement, and generating, based on the compared first measurement and second measurement, an acceptance signal.

In some configurations, executing the at least one verification protocol may include executing the motion sensor protocol. The motion sensor protocol may include receiving, at the controller, motion sensor data from the initiator device, the motion sensor data including a secure certificate, accepting, via the secure ranging application, the secure certificate, and generating, based on the accepted secure certificate, an acceptance signal. In further examples, executing the at least one verification protocol may include executing the dual factor protocol. The dual factor protocol may include executing, based on the connection request, a first command function, receiving, at the secure ranging application, a command request via the initiator device corresponding to a second command function, and issuing, via the secure ranging application, a personal identification number (PIN) to the authorized device in response to the command request from the initiator device. The dual factor protocol may also include receiving, at the secure ranging application, the PIN from the authorized device and executing, based on the received PIN, the second command function. Optionally, executing the at least one verification protocol may include generating an error code and communicating the error code with the back office server. In some instances, the operations may also include executing, based on an error threshold, a theft alarm.

In other aspects, a computer-implemented method when executed by data processing hardware causes the data processing hardware to perform operations. The operations include receiving, at a controller of a responder device, a connection request from an initiator device, executing, via a secure ranging application of the controller, an ultra wideband (UWB) ranging session, and executing, via the controller, a first measurement of the initiator device relative to the responder device. The operations also include identifying at least one verification protocol of the secure ranging application based on the executed UWB ranging session, the at least one verification protocol including at least one of a correlation-based ranging protocol, a secondary ranging protocol, a motion sensor protocol, and a dual factor protocol, executing, based on technology resources of the responder device, one of the correlation-based ranging protocol, the secondary ranging protocol, the motion sensor protocol, and the dual factor protocol, and executing, based on the at least one verification protocol, a command function at the controller of the responder device.

In some examples, executing, based on the technology resources of the responder device, may include executing the correlation-based ranging protocol. The correlation-based ranging protocol may include executing, based on the first measurement being within a measurement range, a localization function via the secure ranging application, sending, based on the executed localization function, localization data including one or more of a responder identification (ID), an initiator ID, an initiator location, and a ranging time to a back office server, requesting, via the back office server, log ranging data from an authorized device, and comparing the localization data with the log ranging data. Optionally, executing, based on the technology resources of the responder device, may include executing the secondary ranging protocol. The secondary ranging protocol may include executing a second measurement via a measurement function of the secure ranging application, comparing the second measurement with the first measurement, and generating, based on the compared first measurement and second measurement, an acceptance signal.

In further examples, executing, based on the technology resources of the responder device, may include executing the motion sensor protocol. The motion sensor protocol may include receiving, at the controller, motion sensor data from the initiator device, the motion sensor data including a secure certificate, accepting, via the secure ranging application, the secure certificate, and generating, based on the accepted secure certificate, an acceptance signal. In some instances, executing, based on the technology resources of the responder device, may include executing the dual factor protocol. The dual factor protocol may include executing, based on the connection request, a first command function, receiving, at the secure ranging application, a command request via the initiator device corresponding to a second command function, and issuing, via the secure ranging application, a personal identification number (PIN) to an authorized device in response to the command request from the initiator device. The dual factor protocol may also include receiving, at the secure ranging application, the PIN from the authorized device and executing, based on the received PIN, the second command function. In some configurations, executing the at least one verification protocol may include generating an error code, communicating the error code with a back office server, and executing, based on an error threshold, a theft alarm.

In further aspects, a secure ranging system for a vehicle includes data processing hardware and memory hardware. The memory hardware is in communication with the data processing hardware, the memory hardware stores instructions that when executed on the data processing hardware cause the data processing hardware to perform operations. The operations include receiving, at a controller of a responder device, a connection request from an initiator device, executing, via a secure ranging application of the controller, an ultra wideband (UWB) ranging session, and executing, via the controller, a first measurement of the initiator device relative to the responder device. The operations also include identifying at least one verification protocol of the secure ranging application based on the executed UWB ranging session, the at least one verification protocol including at least one of a correlation-based ranging protocol, a secondary ranging protocol, a motion sensor protocol, and a dual factor protocol, executing, based on technology resources of the responder device, one of the correlation-based ranging protocol, the secondary ranging protocol, the motion sensor protocol, and the dual factor protocol, and executing, based on the at least one verification protocol, a command function at the controller of the responder device.

In some examples, executing, based on the technology resources of the responder device, may include executing the correlation-based ranging protocol. The correlation-based ranging protocol may include executing, based on the first measurement being within a measurement range, a localization function via the secure ranging application, sending, based on the executed localization function, localization data including one or more of a responder identification (ID), an initiator ID, an initiator location, and a ranging time to a back office server, requesting, via the back office server, log ranging data from an authorized device, and comparing the localization data with the log ranging data. Optionally, executing, based on the technology resources of the responder device, may include executing the secondary ranging protocol. The secondary ranging protocol may include executing a second measurement via a measurement function of the secure ranging application, comparing the second measurement with the first measurement, and generating, based on the compared first measurement and second measurement, a verification signal.

In some instances, executing, based on the technology resources of the responder device, may include executing the motion sensor protocol. The motion sensor protocol may include receiving, at the controller, motion sensor data from the initiator device, the motion sensor data including a secure certificate, accepting, via the secure ranging application, the secure certificate, and generating, based on the accepted secure certificate, an acceptance signal. Optionally, executing, based on the technology resources of the responder device, may include executing the dual factor protocol. The dual factor protocol may include executing, based on the connection request, a first command function, receiving, at the secure ranging application, a command request via the initiator device corresponding to a second command function, and issuing, via the secure ranging application, a personal identification number (PIN) to an authorized device in response to the command request from the initiator device. The dual factor protocol may also include receiving, at the secure ranging application, the PIN from the authorized device and executing, based on the received PIN, the second command function.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
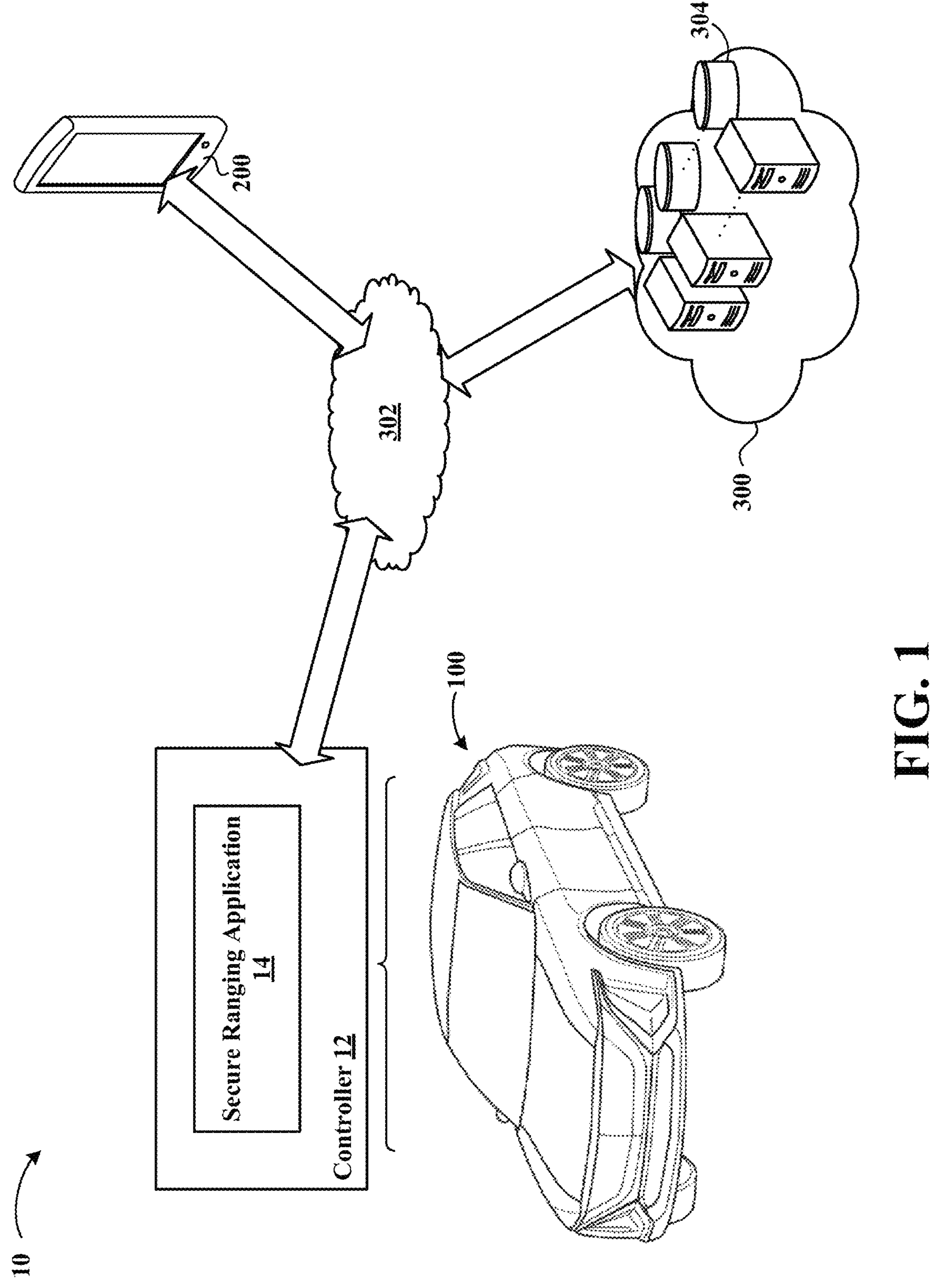
FIG. 1 is a schematic diagram of a secure ranging system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-11, a secure ranging system 10 is configured for improved communication between a controller 12 of a responder device 100, an initiator device 200, and a back office server 300. The responder device 100 is communicatively coupled with the back office server 300 via a network 302 that may include, but is not limited to, a WiFi® or cellular network. The controller 12 is configured with a secure ranging application 14, described below, that receives a connection request 202 from the initiator device 200. The controller 12 may execute the secure ranging application 14 in response to the connection request 202. In some examples described herein, the connection request 202 received at the secure ranging application 14 may trigger a communication between the responder device 100 and the back office server 300. The secure ranging system 10 is configured to advantageously improve a secure connection between the responder device 100 and the initiator device 200 to prevent unauthorized operative access to the responder device 100 by the initiator device 200.

In some instances, the responder device 100 may include a vehicle 100 equipped with a controller 12 configured with the secure ranging application 14. The initiator device 200 may be a user device 200, such as a mobile device, that communicates with the vehicle 100. In some instances, the initiator device 200 may also include an authorized device **200*a*. The authorized device 200*a*, described herein, may be pre-paired with the responder device 100 (i.e., vehicle) during an initial set up session of the responder device 100. Thus, the back office server 300 may store an authorized device profile 306 within server storage 304 for reference by the back office server 300, described below. The server storage 304 may also include responder profiles 308 that may include the authorized device profile 306 associated with the respective responder device 100**.

Each responder profile 308 may be configured with an error threshold 310 corresponding to an error counter 312, which may also be stored on the server storage 304. The error counter 312 is monitored by the back office server 300, and if exceeding the error threshold 310, the back office server 300 may issue an error code 314 to the responder device 100. The error code 314 indicates to the responder device 100 that the initiator device 200 is unauthorized and that there have been repeated attempts to gain operational access to the responder device 100. In some instances, the back office server 300 may issue the error code 314 prior to hitting the error threshold 310, as described in more detail below. It is contemplated that if the error threshold 310 is exceeded, the error code 314 may include instructions to execute a theft alarm 102 at the responder device 100 via the controller 12.

Figure 2:
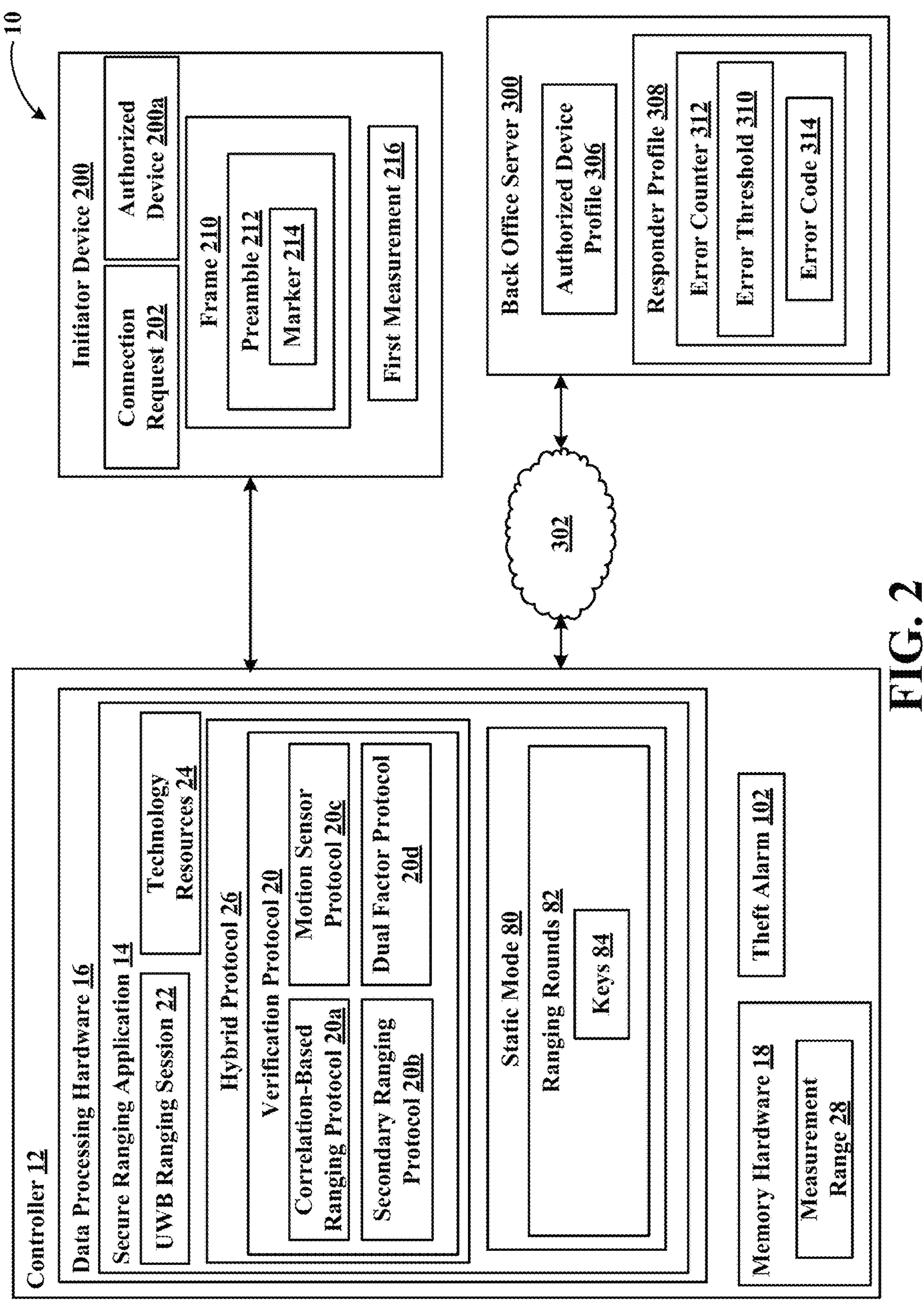
FIG. 2 is an exemplary block diagram of a secure ranging system according to the present disclosure.

Referring now to FIGS. 1 and 2, the controller 12 is configured with data processing hardware 16 in communication with memory hardware 18. The memory hardware 18 stores instructions that, when executed on the data processing hardware 16, cause the data processing hardware 16 to perform operations described herein. For example, the data processing hardware 16 is configured to execute the secure ranging application 14. The secure ranging application 14 includes at least one verification protocol 20 executed as part of an ultra wideband (UWB) ranging session 22. The UWB ranging session 22 is executed in response to the connection request 202 and is configured to connect the initiator device 200 with the responder device 100. For example, the controller 12 may receive the connection request 202 from the initiator device 200 and may, in response, execute the secure ranging application 14. The secure ranging application 14 may concurrently or subsequently execute the UWB ranging session 22.

As part of the UWB ranging session 22, the secure ranging application 14 identifies the verification protocol 20 that fits a connection environment of each of the responder device 100 and the initiator device 200. The verification protocol 20 includes a correlation-based ranging protocol 20*a*, a secondary ranging protocol 20*b*, a motion sensor protocol 20*c*, and a dual factor protocol 20*d*. Each verification protocol 20*a*-20*d* is described in more detail below. The verification protocol 20 selected by the secure ranging application 14 is dependent on technology resources 24 of at least one of the responder device 100 and the initiator device 200. For example, the technology resources 24 may include, but are not limited to, WiFi®, cellular connectivity, WiFi® round trip time (RTT), Bluetooth® (BT) channel sounding, and other practicable technological communication resources. For purposes of this disclosure, the term WiFi® may refer to both private WiFi® and public WiFi® (e.g., trusted access points). The secure ranging application 14 is, thus, a hybrid application and the verification protocol 20 may be identified and executed by a hybrid protocol 26 of the secure ranging application 14. For example, prior to executing the verification protocol 20, the secure ranging application 14 may execute the hybrid protocol 26, described below, to identify which verification protocol 20, based on the technology resources 24, to execute.

The UWB ranging session 22 uses ultra wideband (UWB) ranging that is executed by the secure ranging application 14 using UWB-based ranging in a static mode 80. The static mode 80 involves using a sequence of keys 82 in a repeated pattern across ranging rounds 84. For example, the initiator device 200 may send a frame 210 as part of the connection request 202 including a preamble 212 and a marker 214. The UWB ranging session 22, within the secure ranging application 14, on the responder device 100, looks for the marker 214 in the preamble 212 and may communicate with the initiator device 200 once the marker is identified. The UWB ranging session 22 is an initial step of secure ranging application 14 in establishing a preliminary localization of the initiator device 200.

As part of the preliminary localization, the secure ranging application 14 may execute a first measurement 216 of the initiator device 200 relative to the responder device 100, which may be used as part of the verification protocol 20. For example, the secure ranging application 14 includes a measurement range 28, stored in the memory hardware 18, and compares the first measurement 216 with the measurement range 28 to determine whether the initiator device 200 is within a predetermined proximity of the responder device 100 before proceeding with the verification protocol 20.

Figure 3:
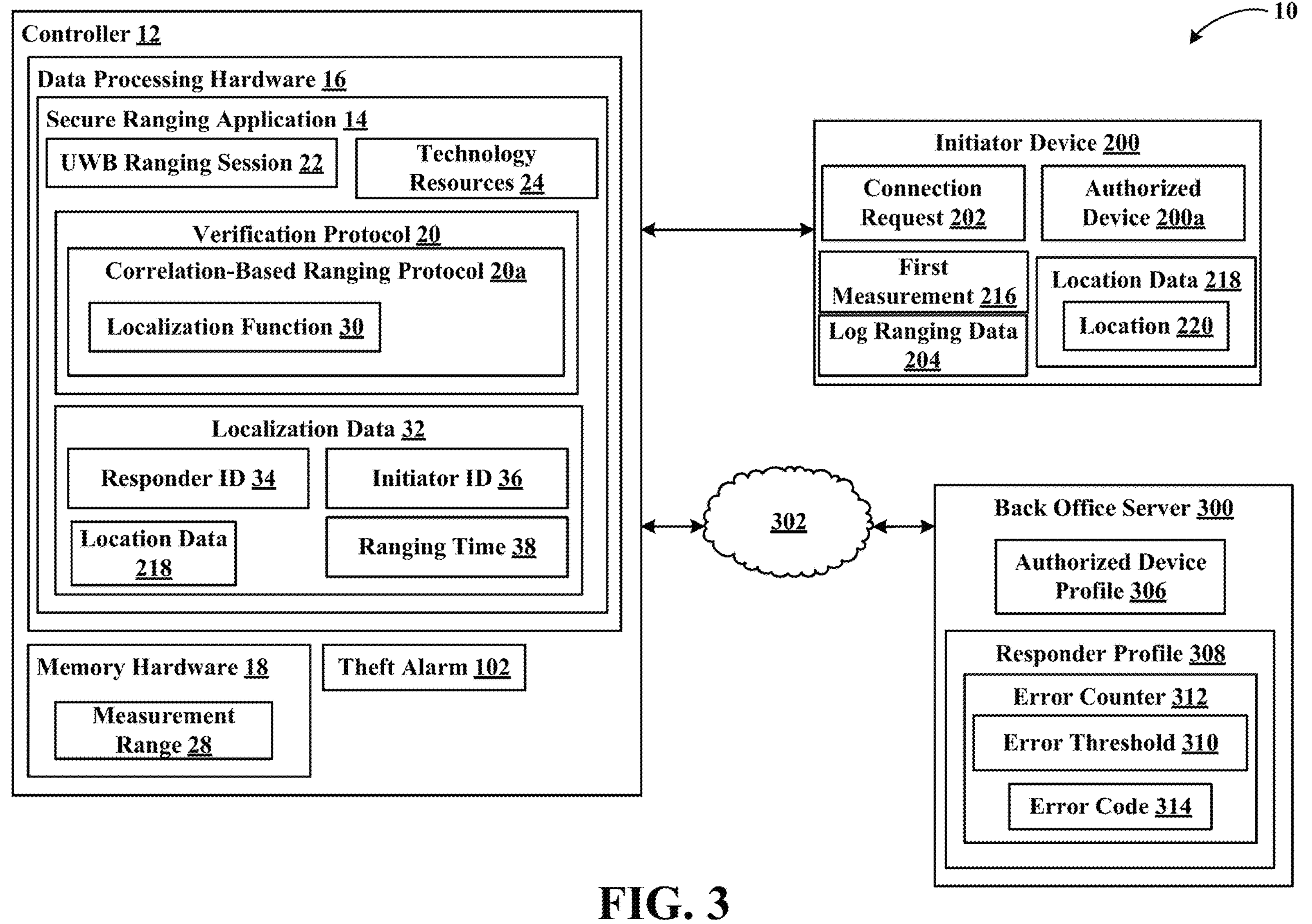
FIG. 3 is an exemplary block diagram of a secure ranging system according to the present disclosure including a location ranging protocol.
Figure 4:
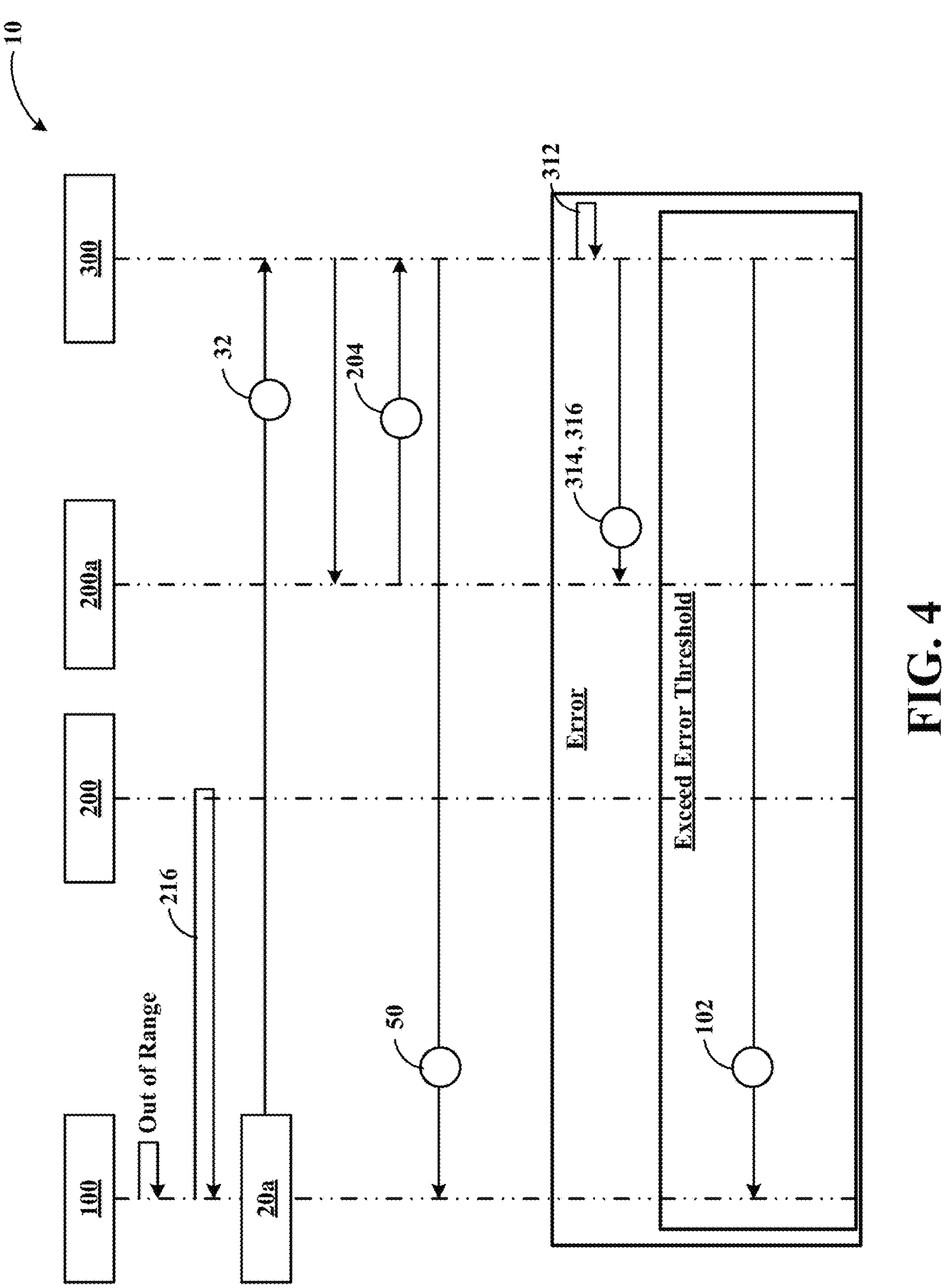
FIG. 4 is an exemplary schematic diagram of the location ranging protocol of FIG. 3.

Referring to FIGS. 3 and 4, the secure ranging application 14 may execute the correlation-based ranging protocol 20*a* based on the technology resources 24 identified. For example, the responder device 100 and the initiator device 200 are equipped with WiFi® and/or cellular connectivity with the back office server 300. The secure ranging application 14 may execute, based on the first measurement 216 being within the measurement range 28, a localization function 30. The localization function 30 analyzes location data 218 received from the initiator device 200 to compute a location 220 of the initiator device 200. The secure ranging application 14 may communicate localization data 32, including the location data 218, with the back office server 300. The localization data 32 includes, in addition to the location data 220, a responder identification (ID) 34, an initiator ID 36, and a ranging time 38. The ranging time 38 corresponds to when the UWB ranging session 22 was completed.

The back office server 300 obtains, from the authorized device 200*a*, log ranging data 204 corresponding to the last UWB ranging session 22 executed by the authorized device 200*a* with the responder device 100 identified in the received localization data 32. The back office server 300 may compare the log ranging data 204 with the location ranging data 32 to determine whether the initiator device 200 should be verified by the correlation-based ranging protocol 20*a*. If the log ranging data 204 matches the localization data 32, then the correlation-based ranging protocol 20*a* may issue an acceptance signal 42. For example, the initiator device 200 may request execution of an unlock feature of a vehicle 100. If the localization data 32 matches or is otherwise verified by the log ranging data 204, then the correlation-based ranging protocol 20*a* may unlock the vehicle 100.

If the location ranging data 32 is inconsistent or otherwise conflicts with the log ranging data 204 from the authorized device 200*a*, then the back office server 300 may increment an error code 314 for the responder device 100 and communicate the error code 314 with the secure ranging application 14. As mentioned above, if the error code 314 exceeds the error threshold 310, then the error code 314 may include an instruction to the secure ranging application 14 to execute the theft alarm 102. If the error code 314 is incremented, then the secure ranging application 14 may determine that the initiator device 200 is different from the authorized device 200*a* and may, as a result, be unauthorized to command the responder device 100.

Figure 5:
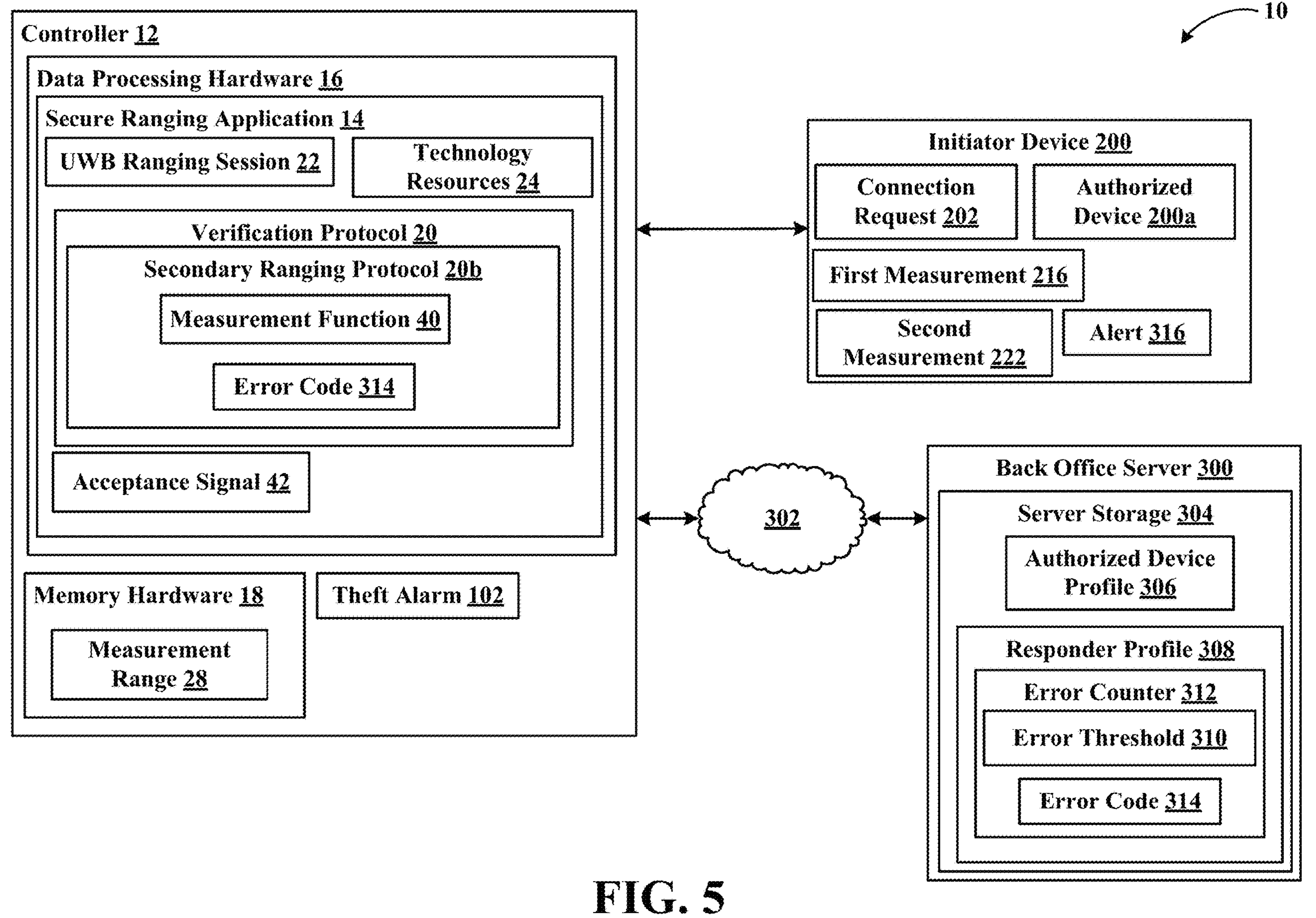
FIG. 5 is an exemplary block diagram of a secure ranging system according to the present disclosure including a secondary ranging protocol.
Figure 6:
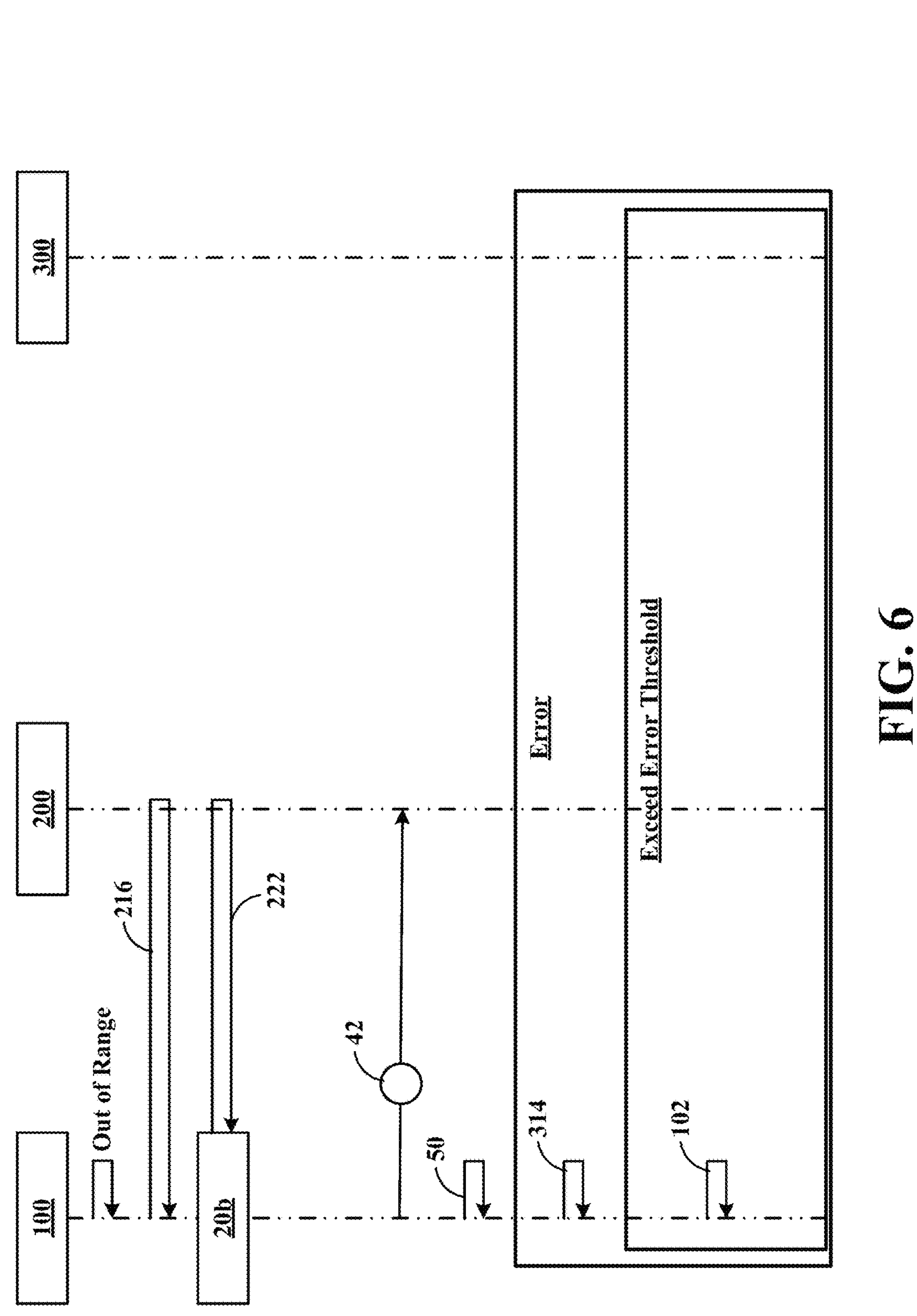
FIG. 6 is an exemplary schematic diagram of the secondary ranging protocol of FIG. 5.

Referring to FIGS. 5 and 6, the secure ranging application 14 may execute the secondary ranging protocol 20*b*. For example, the secure ranging application 14 may determine that the initiator device 200 and/or the responder device 100 does not have access to the network 302 (i.e., Wifi® and/or cellular data), so the secure ranging application 14 may select the secondary ranging protocol 20*b* over the correlation-based ranging protocol 20*a*. In this configuration, the secure ranging application 14 executes the hybrid protocol 26 (FIG. 2), such that the secure ranging application 14 is configured to select from one of the verification protocols 20*a*-20*c* (FIG. 2) depending on the available technology resources 24. The secondary ranging protocol 20*b* utilizes secondary technology resources 24*a*. For example, the secondary technology resources 24*a* may include WiFi® RTT and BT channel sounding.

Once the secure ranging application 14 measures the first measurement 216, the secondary ranging protocol 20*b* executes a measurement function 40. The measurement function 40 is configured to execute a second measurement 222 of the initiator device 200 using the technology resources 24. The secure ranging application 14 may then compare the second measurement 222 with the first measurement 216. If the second measurement 222 is consistent with the first measurement 216, then the secure ranging application 14 accepts the initiator device 200 as authorized and within the measurement range 28. For example, the secure ranging application 14 may generate an acceptance signal 42 from the responder device 100 based on the compared first measurement 216 and second measurement 222. The acceptance signal 42 may authorize the initiator device 200 to execute operations on the responder device 100 (i.e., a vehicle). For example, the initiator device 200 may be authorized to unlock the vehicle 100.

If the second measurement 222 is inconsistent with the first measurement 216, then the secondary ranging protocol 20*b* may issue an error code 314. The secure ranging application 14 may execute the theft alarm 102 based on the error counter 312, which may, in some instances, be stored on the memory hardware 18 of the controller 12. When the responder device 100 is connected to the back office server 300 via the network 302, the secure ranging application 14 communicates any accrued error codes 314 to the back office server 300. If the error codes 314 exceed the error threshold 310, then the back office server 300 communicates with the authorized device 200*a* associated with the authorized device profile 306 stored on the server storage 304. Thus, the authorized device 200*a* receives an alert 316 from the back office server 300 if the error counter 312 exceeds the error threshold 310.

Figure 7:
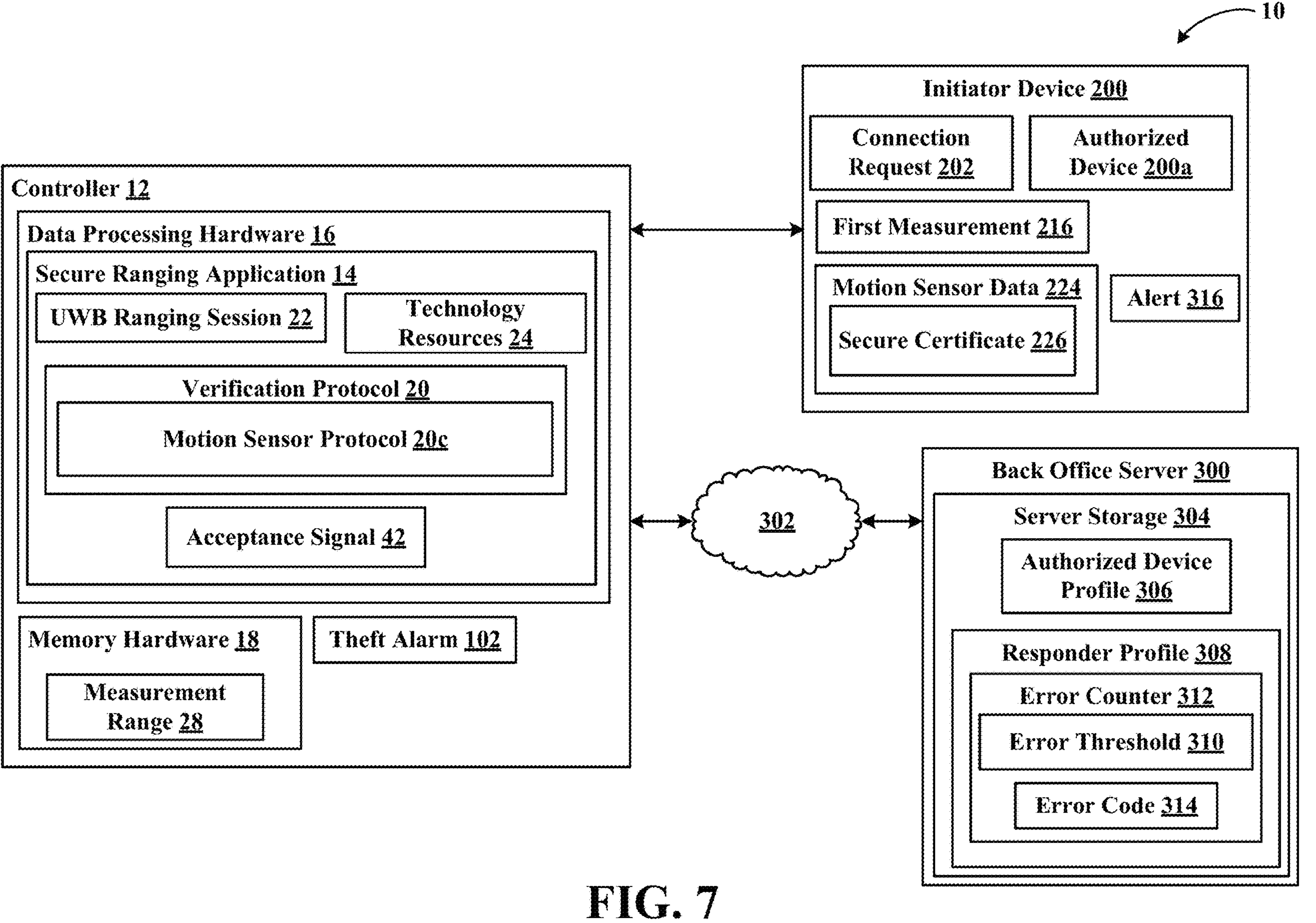
FIG. 7 is an exemplary block diagram of a secure ranging system according to the present disclosure including a motion sensor protocol.
Figure 8:
FIG. 8 is an exemplary schematic diagram of the motion sensor protocol of FIG. 7.
Figure 8:
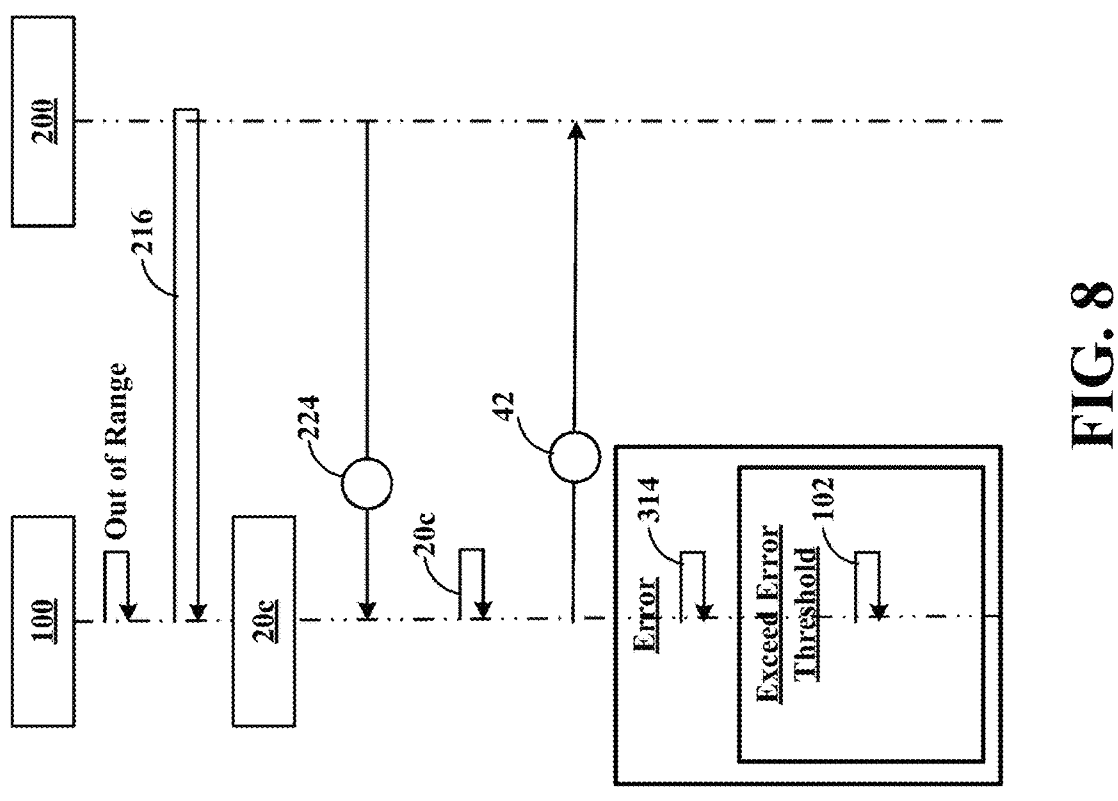

Referring to FIGS. 7 and 8, the secure ranging application 14 may execute the motion sensor protocol 20*c*. As part of the motion sensor protocol 20*c*, the secure ranging application 14 receives motion sensor data 224 from the initiator device 200. The motion sensor data 224 includes a secure certificate 226, which may be configured as a message authentication code and/or a digital signature. The motion sensor protocol 20*c* is configured to verify the secure certificate 226. If the secure certificate 226 is verified, then the secure ranging application 14 compares the motion sensor data 224 with the first measurement 216.

If the motion sensor data 224 is consistent with the first measurement 216, then the secure ranging application 14 generates, based on the verified secure certificate 226, the acceptance signal 42. If the motion sensor data 224 is inconsistent with the first measurement 216 or if the secure certificate 226 is not verified, then the secure ranging application 14 will issue an error code 314. Once the secure ranging application 14 is in communication, via the network 302, with the back office server 300, then the secure ranging application 14 communicates the error code 314 with the back office server 300. As described above, if the error counter 312 exceeds the error threshold 310, then the back office server 300 communicates with the authorized device 200*a* of the attempted access to the responder device 100.

Figure 9:
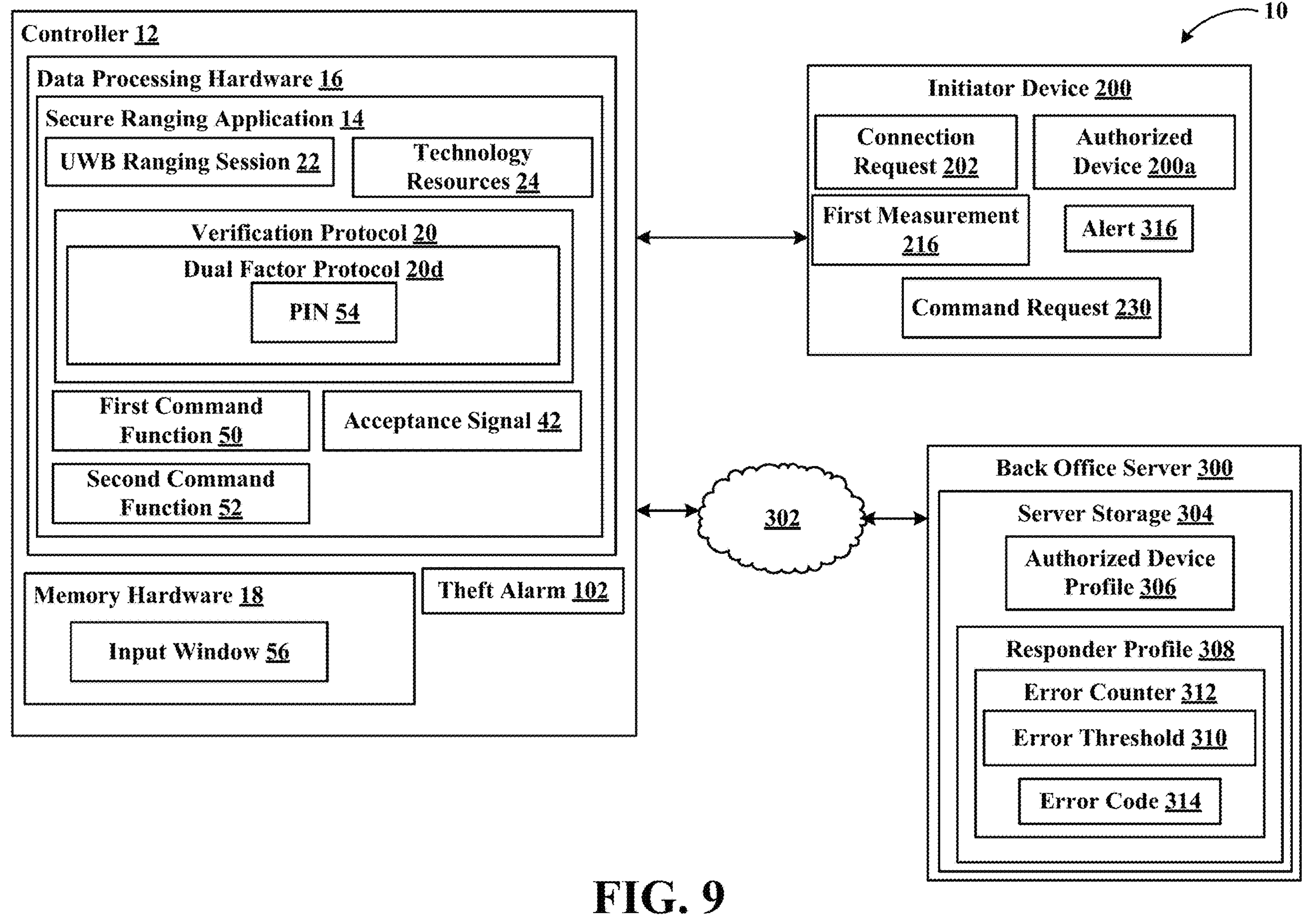
FIG. 9 is an exemplary block diagram of a secure ranging system according to the present disclosure including a dual factor protocol.
Figure 10:
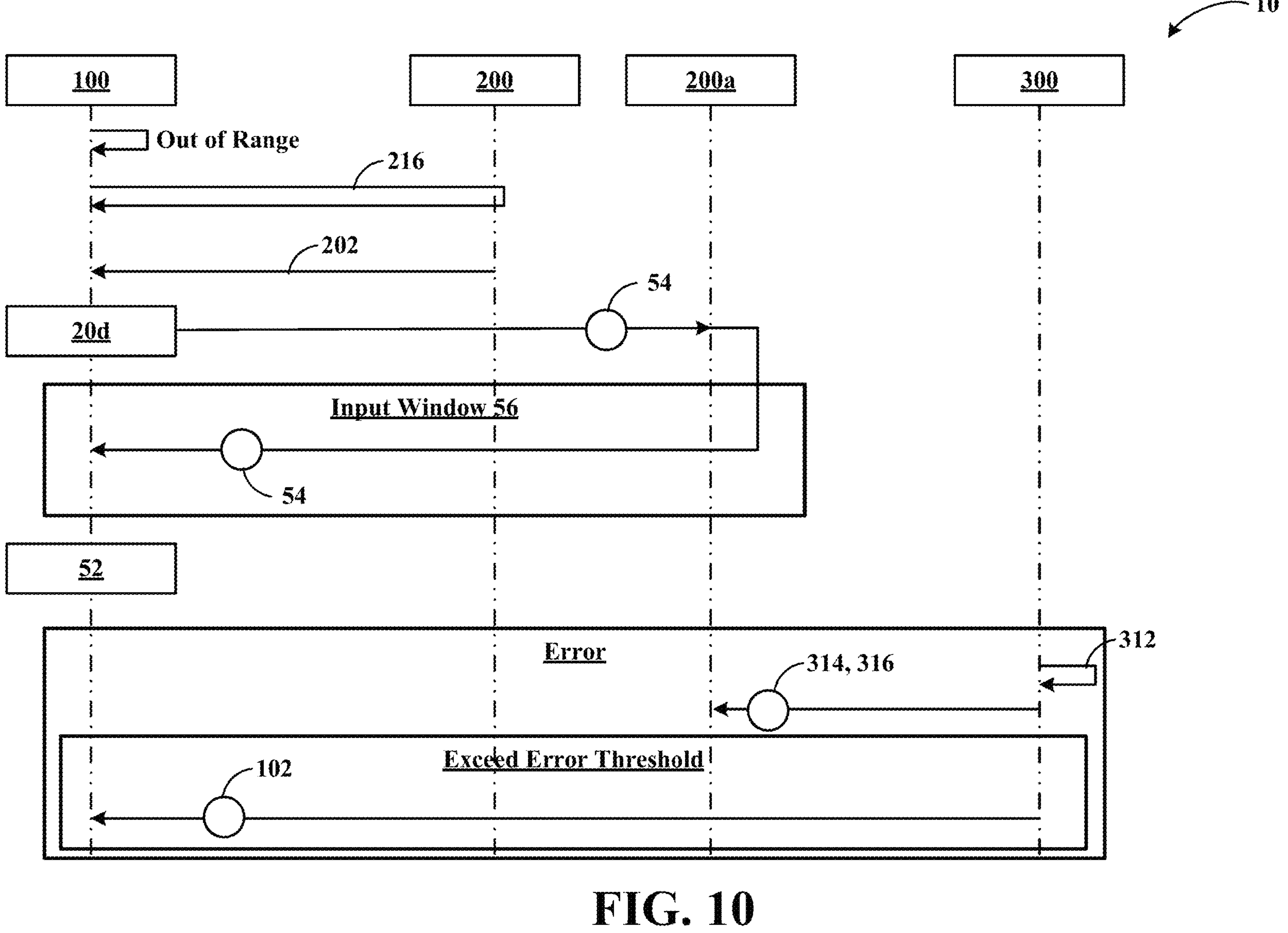
FIG. 10 is an exemplary schematic diagram of the dual factor protocol of FIG. 9.

Referring to FIGS. 9 and 10, the secure ranging application 14 may, in some instances, execute the dual factor protocol 20*d*. For example, the secure ranging application 14, when executing the hybrid protocol 26, may determine that the responder device 100 does not have access to the technology resources 24 to execute the other verification protocols 20*a*-20*c*. The dual factor protocol 20*d* advantageously provides a verification protocol 20 that is free from using the technology resources 24 used in the other verification protocols 20*a*-20*c*. The secure ranging application 14 may execute, based on the connection request 202, a first command function 50. For example, the command function 50 may correspond with unlocking the responder device 100 (i.e., a vehicle 100) when the initiator device 200 is recognized as authorized and determined to be within the measurement range 28 (FIG. 2).

The dual factor protocol 20*d* may be prompted by a command request 230 corresponding to a second command function 52. For example, after unlocking the vehicle 100, an ignition button of the vehicle 100 may be pressed, corresponding to the second command function 52 and command request 230. The dual factor protocol 20*d* generates a personal identification number (PIN) 54, which is communicated to the authorized device 200*a* in response to the command request 230. The PIN 54 may include, but is not limited to, a one-time PIN generated with each time the second command function 52 is issued, such that the PIN 52 is sent to the authorized device 200*a* using a previously-established secure channel other than UWB, and a long-term PIN 54 generated at the time the authorized device 200*a* is paired with the responder device 100, such that the authorized device 200*a* provides the long-term PIN 54 to the responder device 100 using a secure channel other than UWB. For example, the secure channel may include, but is not limited to, inputting the PIN 54 at an application interface and/or sending the PIN 54 through Bluetooth®. As mentioned above, the authorized device 200*a* may be configured with the responder device 100 upon an initial set-up of the responder device 100, such that the authorized device profile 306 may be stored on the memory hardware 18. Thus, the secure ranging application 14 may access the authorized device profile 306 to identify and communicate with the authorized device 200*a*.

The dual factor protocol 20*d* waits to execute the second command function 52 until the PIN 54 is provided at the responder device 100. For example, the user may be prompted to input the PIN 54 on an infotainment center of the vehicle 100. Once the secure ranging application 14 receives the PIN 54 from the authorized device 200*a*, the secure ranging application 14 may execute the second command function 52. If the PIN 54 is not received or input within an input window 56, then the secure ranging application 14 may issue an error code 314, which is, ultimately, communicated with the back office server 300. The back office server 300, as described above, alerts the authorized device 200*a* of the incremented error code 314 when the error counter 312 exceeds the error threshold 310.

Referring to FIGS. 3-10, the secure ranging application 14 is configured to execute any one of the verification protocols 20*a*-20*d* individually, such that the secure ranging application 14 may be configured with one or more of the verification protocols 20*a*-20*d* described herein. It is also contemplated that the secure ranging application 14 may execute the hybrid protocol 26, mentioned above, to select the verification protocol 20*a*-20*d* with the best fit based on the available technology resources 24. Thus, the secure ranging application 14 is a flexible algorithm configured to identify which verification protocol 20*a*-20*d* to execute based on the identified technology resources of the responder device 100.

Figure 11:
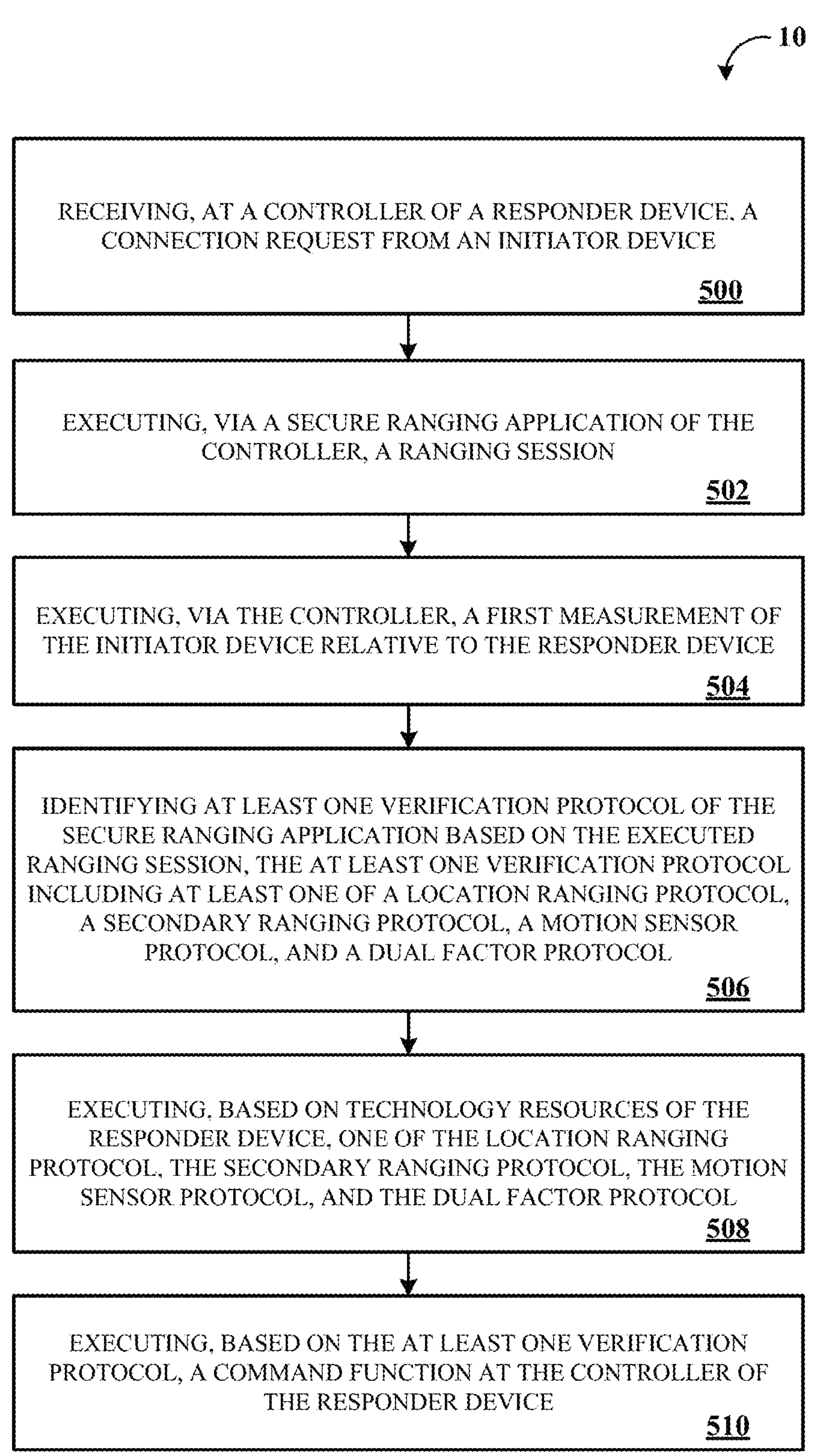
FIG. 11 is an exemplary flow diagram of a secure ranging system according to the present disclosure.

Referring to FIG. 11, an exemplary flow diagram for the secure ranging system 10 is illustrated. At 500, the controller 12 receives a connection request 202 from an initiator device 200 and executes, at 502, via a secure ranging application 14 of the controller 12, a UWB ranging session 22. The secure ranging system 10 executes, at 504, a first measurement 216 of the initiator device 200 relative to the responder device 100 and identifies, at 506, at least one verification protocol 20 of the secure ranging application 14 based on the executed UWB ranging session 22. The at least one verification protocol 20 includes at least one of a correlation-based ranging protocol 20*a*, a secondary ranging protocol 20*b*, a motion sensor protocol 20*c*, and a dual factor protocol 20*d*. The secure ranging system 10 executes, at 508, based on technology resources 24 of the responder device 100, one of the correlation-based ranging protocol 20*a*, the secondary ranging protocol 20*b*, the motion sensor protocol 20*c*, and the dual factor protocol 20*d*. The secure ranging system 10 then executes, at 510, based on the at least one verification protocol 20, a command function 50 at the controller 12 of the responder device 100.

Referring again to FIGS. 1-11, the secure ranging system advantageously increases security of a UWB ranging session 22 by implementing a verification protocol 20 via the secure ranging application 14. The secure ranging application 14 may be configured with a hybrid protocol 26, which may advantageously identify and select a verification protocol 20*a*-20*d* based on technology resources 24 of the responder device 100 (e.g., vehicle). It is contemplated that the secure ranging application 14 may be equipped with each the correlation-based ranging protocol 20*a*, the secondary ranging protocol 20_b_, the motion sensor protocol 20_c_, and the dual factor protocol 20_d_, and the secure ranging application 14 may select one of the verification protocols 20_a_-20_d_ based on the available technology resources 24 via the hybrid protocol 26. Thus, regardless of the technology resources 24, the responder device 100 is equipped with heightened security measures in verifying the initiator device 200.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

receiving, at a controller of a responder device, a connection request from an initiator device;

executing, via a secure ranging application of the controller, an ultra wideband (UWB) ranging session;

executing, via the controller, a first measurement of the initiator device relative to the responder device;

identifying at least one verification protocol of the secure ranging application based on the executed UWB ranging session, the at least one verification protocol including a correlation-based ranging protocol including:

executing, based on the first measurement being within a measurement range, a localization function via the secure ranging application;

sending, based on the executed localization function, localization data including one or more of a responder identification (ID), an initiator ID, an initiator location, and a ranging time to a back office server;

requesting, via the back office server, log ranging data from an authorized device; and comparing the localization data with the log ranging data;

executing, via the secure ranging application, the at least one verification protocol; and executing, based on the at least one verification protocol, a command function at the controller of the responder device.

2. The method of claim 1, wherein the secure ranging application is a hybrid application configured to identify the at least one verification protocol based on technology resources of at least one of the responder device and the initiator device.

3. The method of claim 2, wherein the at least one verification protocol includes the correlation-based ranging protocol, a secondary ranging protocol, a motion sensor protocol, and a dual factor protocol.

4. The method of claim 3, wherein executing the at least one verification protocol includes executing the correlation-based ranging protocol.

5. The method of claim 3, wherein executing the at least one verification protocol includes executing the secondary ranging protocol, the secondary ranging protocol including:

executing a second measurement via a measurement function of the secure ranging application;

comparing the second measurement with the first measurement; and generating, based on the compared first measurement and second measurement, an acceptance signal.

6. The method of claim 3, wherein executing the at least one verification protocol includes executing the motion sensor protocol, the motion sensor protocol including:

receiving, at the controller, motion sensor data from the initiator device, the motion sensor data including a secure certificate;

accepting, via the secure ranging application, the secure certificate; and generating, based on the accepted secure certificate, an acceptance signal.

7. The method of claim 3, wherein executing the at least one verification protocol includes executing the dual factor protocol, the dual factor protocol including:

executing, based on the connection request, a first command function;

receiving, at the secure ranging application, a command request via the initiator device corresponding to a second command function;

issuing, via the secure ranging application, a personal identification number (PIN) to the authorized device in response to the command request from the initiator device;

receiving, at the secure ranging application, the PIN from the authorized device; and executing, based on the received PIN, the second command function.

8. The method of claim 1, wherein executing the at least one verification protocol includes generating an error code and communicating the error code with the back office server.

9. The method of claim 8, further including executing, based on an error threshold, a theft alarm.

10. A computer-implemented method when executed by data processing hardware causes the data processing hardware to perform operations comprising:

receiving, at a controller of a responder device, a connection request from an initiator device;

executing, via a secure ranging application of the controller, an ultra wideband (UWB) ranging session;

executing, via the controller, a first measurement of the initiator device relative to the responder device;

identifying at least one verification protocol of the secure ranging application based on the executed UWB ranging session, the at least one verification protocol including at least one of a correlation-based ranging protocol, a secondary ranging protocol, a motion sensor protocol, and a dual factor protocol;

executing, based on technology resources of the responder device, one of the correlation-based ranging protocol, the secondary ranging protocol, the motion sensor protocol, and the dual factor protocol including executing the secondary ranging protocol including:

executing a second measurement via a measurement function of the secure ranging application;

comparing the second measurement with the first measurement; and generating, based on the compared first measurement and second measurement, an acceptance signal; and executing, based on the at least one verification protocol, a command function at the controller of the responder device.

11. The method of claim 10, wherein executing, based on the technology resources of the responder device, includes executing the correlation-based ranging protocol, the correlation-based ranging protocol including:

executing, based on the first measurement being within a measurement range, a localization function via the secure ranging application;

sending, based on the executed localization function, localization data including one or more of a responder identification (ID), an initiator ID, an initiator location, and a ranging time to a back office server;

requesting, via the back office server, log ranging data from an authorized device; and comparing the localization data with the log ranging data.

12. The method of claim 10, wherein executing, based on the technology resources of the responder device, includes executing the motion sensor protocol, the motion sensor protocol including:

receiving, at the controller, motion sensor data from the initiator device, the motion sensor data including a secure certificate;

accepting, via the secure ranging application, the secure certificate; and generating, based on the accepted secure certificate, an acceptance signal.

13. The method of claim 10, wherein executing, based on the technology resources of the responder device, includes executing the dual factor protocol, the dual factor protocol including:

executing, based on the connection request, a first command function;

receiving, at the secure ranging application, a command request via the initiator device corresponding to a second command function;

issuing, via the secure ranging application, a personal identification number (PIN) to an authorized device in response to the command request from the initiator device;

receiving, at the secure ranging application, the PIN from the authorized device; and executing, based on the received PIN, the second command function.

14. The method of claim 10, wherein executing the at least one verification protocol includes:

generating an error code;

communicating the error code with a back office server; and executing, based on an error threshold, a theft alarm.

15. The method of claim 10, wherein the secure ranging application is a hybrid application configured to identify the at least one verification protocol based on the technology resources of at least one of the responder device and the initiator device.

16. A secure ranging system for a vehicle, the secure ranging system comprising:

data processing hardware; and memory hardware in communication with the data processing hardware, the memory hardware storing instructions that when executed on the data processing hardware cause the data processing hardware to perform operations comprising:

receiving, at a controller of a responder device, a connection request from an initiator device;

executing, via a secure ranging application of the controller, an ultra wideband (UWB) ranging session;

executing, via the controller, a first measurement of the initiator device relative to the responder device;

identifying at least one verification protocol of the secure ranging application based on the executed UWB ranging session, the at least one verification protocol including at least one of a correlation-based ranging protocol, a secondary ranging protocol, a motion sensor protocol, and a dual factor protocol;

executing, based on technology resources of the responder device, one of the correlation-based ranging protocol, the secondary ranging protocol, the motion sensor protocol, and the dual factor protocol including executing the correlation-based ranging protocol including:

executing, based on the first measurement being within a measurement range, a localization function via the secure ranging application;

sending, based on the executed localization function, localization data including one or more of a responder identification (ID), an initiator ID, an initiator location, and a ranging time to a back office server;

requesting, via the back office server, log ranging data from an authorized device; and comparing the localization data with the log ranging data; and executing, based on the at least one verification protocol, a command function at the controller of the responder device.

17. The secure ranging system of claim 16, wherein executing, based on the technology resources of the responder device, includes executing the secondary ranging protocol, the secondary ranging protocol including:

executing a second measurement via a measurement function of the secure ranging application;

comparing the second measurement with the first measurement; and generating, based on the compared first measurement and second measurement, a verification signal.

18. The secure ranging system of claim 16, wherein executing, based on the technology resources of the responder device, includes executing the motion sensor protocol, the motion sensor protocol including:

receiving, at the controller, motion sensor data from the initiator device, the motion sensor data including a secure certificate;

accepting, via the secure ranging application, the secure certificate; and generating, based on the accepted secure certificate, an acceptance signal.

19. The secure ranging system of claim 16, wherein executing, based on the technology resources of the responder device, includes executing the dual factor protocol, the dual factor protocol including:

executing, based on the connection request, a first command function;

receiving, at the secure ranging application, a command request via the initiator device corresponding to a second command function;

issuing, via the secure ranging application, a personal identification number (PIN) to the authorized device in response to the command request from the initiator device;

receiving, at the secure ranging application, the PIN from the authorized device; and executing, based on the received PIN, the second command function.

20. The secure ranging system of claim 16, wherein the secure ranging application is a hybrid application configured to identify the at least one verification protocol based on the technology resources of at least one of the responder device and the initiator device.

* * * * *